(12) United States Patent
Myreen

(10) Patent No.: US 6,183,598 B1
(45) Date of Patent: Feb. 6, 2001

(54) PROCESS FOR RECOVERING ALKALI AND BLACK LIQUOR CONTAINING SILICATAE

(75) Inventor: Bertel Myreen, Helsinki (FI)

(73) Assignee: Jaako Poyry Oy, Vantaa (FI)

( * ) Notice: Under 35 U.S.C. 154(b), the term of this patent shall be extended for 0 days.

(21) Appl. No.: 09/164,478

(22) Filed: Oct. 1, 1998

(30) Foreign Application Priority Data

Oct. 13, 1997 (FI) ....................................... 973942

(51) Int. Cl.$^7$ ............................ D21C 11/00; D21C 11/12
(52) U.S. Cl. ...................... 162/29; 162/30.1; 162/30.11; 162/31
(58) Field of Search ............................... 162/16, 29, 30.1, 162/30.11, 31

(56) References Cited

U.S. PATENT DOCUMENTS

| | | | |
|---|---|---|---|
| 4,872,950 | * | 10/1989 | Andersson et al. ................ 162/15 |
| 4,911,787 | * | 3/1990 | Shimokura et al. ............ 162/30.11 |

FOREIGN PATENT DOCUMENTS

| | | | |
|---|---|---|---|
| 823543 | | 10/1982 | (FI) . |
| 85517 | | 1/1992 | (FI) . |
| 3972775 | | 4/1991 | (JP) . |
| WO 96/10544 | * | 4/1996 | (WO) . |
| WO 96/14468 | * | 5/1996 | (WO) . |

OTHER PUBLICATIONS

Derwent English–language Abstract of WO 82/02909.

* cited by examiner

Primary Examiner—Dean T. Nguyen
(74) Attorney, Agent, or Firm—Rockey, Milnamow & Katz, Ltd.

(57) ABSTRACT

The invention relates to a process for recovering alkali and heat from a black liquor (5) containing silicate from a soda cook of e.g. grass, reed, straw and bagasse. In the process the black liquor (5) is treated with a gas (6) containing carbon dioxide to precipitate silica and lignin, the precipitate (9) is separated (2) from the black liquor, which is evaporated (3) and burnt (4) to generate heat and to recover a sodium carbonate melt. In the invention the black liquor (5) containing silicate is neutralised with a surplus of the gas (6) containing carbon dioxide, which preferably contains over 60% by volume of carbon dioxide. The evaporation (3) of black liquor mainly takes place after the precipitate (9) rich in silica has been separated (2). The combustion is performed with pure oxygen gas or oxygen-enriched air (14), after the black liquor has been brought to a temperature near its boiling point by direct contact with the hot exhaust gases from combustion, all these operations under a substantial over-pressure of at least 100 kPa. With this procedure, a sodium carbonate melt is recovered and a gas (17) containing over 60% by volume of carbon dioxide is formed, which is used to neutralise the black liquor (5) containing silicate.

16 Claims, 1 Drawing Sheet

PROCESS FOR RECOVERING ALKALI AND BLACK LIQUOR CONTAINING SILICATAE

FIELD OF THE INVENTION

The present invention relates to a process for recovering alkali and energy from black liquor containing silicate obtained from a process making paper pulp, and particularly to a process in which black liquor containing silicate is brought into direct contact with a gas containing carbon dioxide in order to precipitate silica and lignin from the black liquor, a solid precipitate rich in silica is separated from the black liquor, the black liquor is evaporated to be concentrated and the concentrated black liquor poor in silicate is burnt to generate heat and to recover a sodium carbonate melt, which can be causticised after it has been dissolved in water.

BACKGROUND OF THE INVENTION

The production of chemical pulp for paper production chiefly uses wood as a raw material. However, about 10% of the chemical pulp produced the world over is produced from other plants and plant residues such as grass, reed, straw and bagasse. The characteristic of these raw materials is that they contain, among other substances, considerably more silicon than wood does.

Chemical paper pulp is produced by cooking the raw material with chemicals, non-fibrous material being then chemically dissolved. The cellulose fibres constituting the paper pulp will remain. A large part of the dissolved material consists of lignin, but also of other organic and inorganic substances. The production of chemical pulp from wood mainly implements the sulphate process, in which sodium hydroxide and sodium sulphide are active components of the cooking liquor. For the cooking of non-wood raw material sodium hydroxide alone is required as an active chemical, and for this reason the major part of chemical pulp production from these raw materials is performed with the process called the soda process.

In the soda process the raw material is heated together with an alkaline cooking liquor containing sodium hydroxide to a temperature in the range from 140 to 170° C. under pressure. The cooking liquor should have a high alkaline concentration. Under these conditions, the main portion of lignin will be dissolved from the raw material, however, also the main portion of the silicon in the raw material will react with the sodium hydroxide, forming water-soluble sodium silicate. Thus the black liquor produced in cooking will contain silicate ions in addition to lignin and other organic compounds.

On principle, sodium hydroxide can be recovered from the black liquor and the organic substance in the black liquor can be utilised as a fuel for energy generation. Contrary to the sulphate process, in which the cooking liquor contains sulphide ions and the combustion of black liquor requires a chemically reducing environment in the bottom section of the combustion equipment, the black liquor obtained by using the soda process can be burnt even under highly oxidising conditions. Chemical recovery is performed by evaporating the black liquor to a suitable dry matter content and by burning the evaporated liquor by means of excess oxygen. The inorganic combustion residue, consisting mainly of sodium carbonate, is dissolved in water and causticised with burnt lime to form sodium hydroxide, which in turn is used in pulp cooking. This is the practice in the case of black liquors poor in silicate. However, the presence of silicate in the black liquor entails serious problems regarding recovery. The main problems consist in scaling of the heat exchange surfaces of the evaporator in which the black liquor is concentrated, high viscosity of the concentrated black liquor, which impedes liquor combustion, and forming of calcium silicate in the lime used for converting the sodium carbonate to sodium hydroxide. The calcium silicate makes recycling of the lime difficult or quite impossible. Due to the problems caused by silicate, pulp mills using e.g. straw as a raw material are unable to reclaim the black liquor and to recover sodium hydroxide from this, but instead discharge the black liquor. This is evidently a heavy financial burden for the mill and very detrimental to the environment around the mill.

There have been attempts to solve the problems caused by silicate in the black liquor over the past 20 years. It is a well-known chemical fact that, when the acidity, i.e. the pH of the solution is reduced, the silicate ions will form a partly gelly and partly crystalline silica (cf. e.g. Chemical Abstracts, Vol. 89, No 61292, 1978). Methods for removing silicate from black liquor have been developed on the basis of this crystallisation. A process following the procedure described here was installed at the RAKTA company's mill in Egypt. The pH reduction is performed by introducing flue gas containing carbon dioxide into the black liquor. In accordance with the described procedure, the substance containing silicon is separated from the black liquor by sedimentation and/or centrifugation, after which the silicon is precipitated as a mixture of silica and calcium silicate by adding burnt or slaked lime. The process has been patented by J. Mülder and P. Gutmann (Germany, 3003090 8/1981).

All the same, the RAKTA installation never worked satisfactorily in the practice. The reason for this is that, in order to convert a sufficient portion of the silicate into a crystalline and hence separable form, the pH must be so much decreased that also a portion of the lignin in the black liquor will be converted into a gelatinous phase and that makes the separation of the silica and the gelatinous lignin from the liquor very difficult. Removal of lignin from the liquor will decrease its calorific value, so it will not be high enough to allow it to be burnt in steam boilers developed for liquor combustion. Another attempt to enhance the techniques developed in the late 70's is being made at a mill in Tamil Nadu, India. This process still follows the same principle as the RAKTA process. The operation aims at recycling crystal nuclei of silica at a pH high enough to selectively precipitate silica without coprecipitation of lignin.

Another means of removing silicon from the chemical recovery cycle at a mill which produces paper pulp from straw following the soda process is described in the Indian patent 17 1289 from 1989. In this process, the silicate-containing black liquor is evaporated to an approx. 40% dry matter content, after which it is mixed with dry organic material, e.g. rice husks, the ensuing dry matter content being approx. 60 per cent. The mixture is burnt on a chain grate in the furnace of a steam boiler. The inorganic combustion residue, containing mainly sodium carbonate and sodium silicate, is dissolved in water, and flue gases containing carbon dioxide are introduced in the aqueous solution. The carbon dioxide reduces the pH, and then the silicate forms poorly soluble silica, which is filtrated out of the solution. In this manner, the silicon can be removed without the lignin interfering with the separation of the precipitate or it losing its energy content. The process of the patent involves the problem of requiring the combustion temperature to be maintained within the range from 750 to 820° C. to prevent the ashes from melting and to simultaneously completely burn the organic substance completely. These aims are considered to be very difficult to achieve at a full-scale plant, and the process has not been industrially implemented so far.

U.S. Pat. No. 4,504,356 also discloses a process for removing silicate from black liquor, in which the black liquor is first evaporated and is subsequently treated with flue gases, which are supplied in an amount of 30 to 40 m$^3$ per m$^3$ of black liquor. The precipitated silica is separated, diluted and washed with water. However, the evaporation of the silicate-containing black liquor causes problems due to scaling etc., and the problems with co-precipitation of lignin are not overcome.

A further inconvenience of these known processes is that flue gases are used as the carbon dioxide source. Flue gases are obtained in the combustion of an organic substance by means of air and they contain 10 to 20% by volume of carbon dioxide, whereas the major portion of the gas consists of the nitrogen in the combustion air. This inert portion of the flue gas will not be absorbed by the alkaline solution containing silicate, but will instead pass through this and cause foaming.

The purpose of the present invention is to eliminate the drawbacks of these known processes and to provide a process for economical and trouble-free recovery of alkali and heat from black liquor containing silicate in an environment-friendly manner.

The main characteristics of the present invention are set forth in the accompanying claims.

BRIEF SUMMARY OF THE INVENTION

Hence, in the present invention, it is essential that the black liquor containing silicate is neutralised with a surplus of the gas containing carbon dioxide, and this has to be performed with a gas containing predominantly carbon dioxide, preferably more than 60% by volume of carbon dioxide. Ordinary flue gases do not normally meet this requirement.

Moreover, in order to avoid scaling, the evaporation of black liquor should take place mainly after the solid precipitate rich in silica has been removed from the saturated black liquor.

In addition, to allow an economical means of heat generation, of production of sodium carbonate melt and of formation of a gas which primarily contains carbon dioxide and is suitable for the saturation of supplied black liquor containing silicate, the combustion of the evaporated black liquor poor in silicate should be performed with pure oxygen gas or oxygen-enriched air, after the black liquor has been brought to a temperature close to its boiling point by direct contact with the hot exhaust gases from combustion, all these operations taking place under substantial over-pressure, so that the gas volumes will be kept low and the carbon dioxide concentrations of these high, preferably over 60% by volume.

A preferred embodiment of the invention comprises, instead of controlling the flue gas supply to the black liquor containing silicate in order to maintain the desired pH of the liquor, keeping the non-absorbed carbon dioxide concentration constant in the gas discharge from the neutralisation step. This is far simpler an operation than keeping the pH of the black liquor constant during precipitation.

The treatment of the black liquor containing silicate by means of the gas containing chiefly carbon dioxide is appropriately carried out at a temperature of at least 80° C., e.g. approx. 100° C., over a period of at least 10 minutes.

The combustion of the evaporated black liquor poor in silicate is preferably performed with a gas containing at least 60% by volume of oxygen, most preferably with pure oxygen gas.

The combustion and the final evaporation of the evaporated black liquor poor in silicate by means of the hot exhaust gases from the combustion takes place under a substantial over-pressure, which is preferably at least 100 kPa, most preferably under a pressure in the range from 900 to 1,100 kPa, e.g. 1,000 kPa. The temperature should be at least 800° C. and preferably in the range from 1,000 to 1,400° C.

The present invention allows economical combustion of evaporated black liquors poor in silicate whose viscosity is low enough not to cause problems during combustion, and whose calorific value has been reduced by removal of organic substance from the liquors, preferably black liquors poor in silicate which have been evaporated to a dry matter content of 30 to 40% by weight.

In the process of the invention, silica and lignin are thus precipitated from black liquor by neutralisation with carbon dioxide. After the precipitate has been removed from the black liquor, whose calorific value is now low since a major portion of lignin has been removed, the liquor is evaporated to a dry matter content allowing practially complete combustion in a pressurised reactor by means of an oxygen-enriched gas, which appropriately contains over 60% by weight of oxygen gas. The reaction products obtained are a melt containing mainly sodium carbonate and a gas with carbon dioxide as the main component. The carbonate melt is dissolved in water, the solution is filtrated and the sodium carbonate is causticised to sodium hydroxide. The gas is used to neutralise incoming black liquor with carbon dioxide.

BRIEF DESCRIPTION OF THE DRAWINGS

The process will be described below with the aid of the accompanying drawing, FIG. 1 which shows a connecting pattern of a preferred embodiment of the invention.

DETAILED DESCRIPTION OF THE INVENTION

Figure 1:
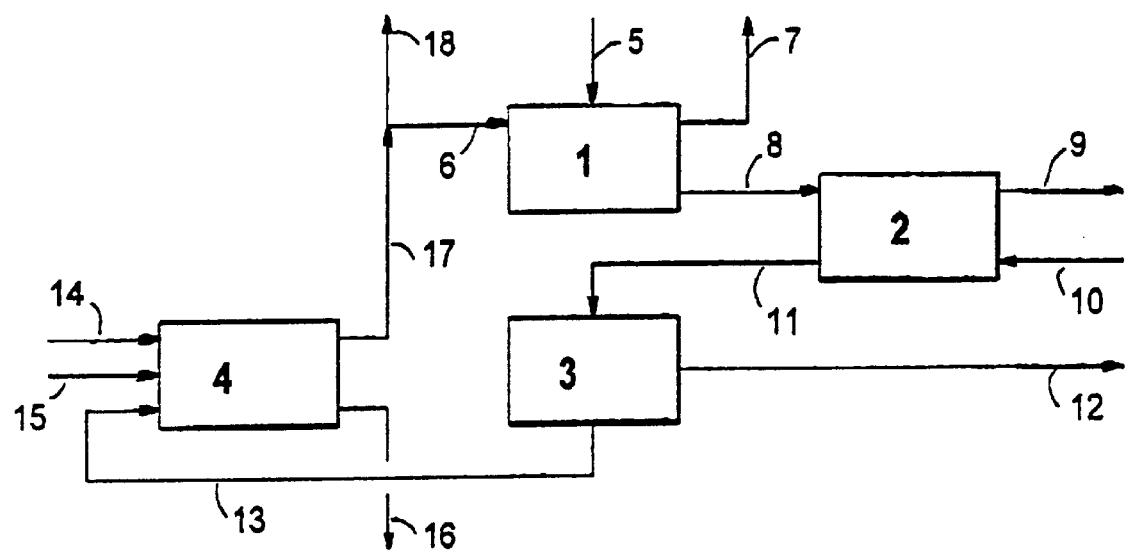

The invention utilises the known process of precipitating silica by neutralising with carbon dioxide. In the drawing, 1 denotes a device in which incoming black liquor 5 rich in silicate is brought into contact with a gas 6, which contains over 60% by volume of carbon dioxide. Contrary to previously known processes, this process does not aim at minimising the coprecipitate with lignin, but instead, carbon dioxide is supplied in such an amount that the precipitate will be readily filtrated from the liquor. For this reason, gas is supplied in such an amount that outgoing black liquor 8 will be saturated with carbon dioxide and a given surplus of carbon dioxide 7 flows out of the apparatus along with inert gas components from gas 6. Such a gas component is for instance the excess oxygen gas which is supplied to combustion apparatus 4 and which is not consumed as the organic substances of the black liquor are oxidised. In this situation, the supply of gas containing carbon dioxide to contact device 1 can be controlled so as to keep the carbon dioxide concentration constant in gas flow 7, which is far simpler a measure than controlling the gas supply so as to keep the pH constant in some part of contact device 1, which has been the case in previously known processes.

In contact device 1 the black liquor is kept at a temperature, preferably close to 100° C., and over a period, preferably more than 10 minutes, such that silica will crystallise in the black liquor. As the black liquor is saturated with carbon dioxide, the lignin will also be transformed in the solid phase. The slurry formed 8 is conducted to a device 2 in which the solid phase is separated from the liquid. This device may be a filter, preferably a chamber filter press, in which the solid phase also can be washed with incoming water 10, but it may also be a sedimentation apparatus, a centrifuge or a combination of such devices. The lignin containing silica in mixture 9 can for instance be utilised as supplementary fuel in a steam boiler burning other solid fuel.

The black liquor 11, from which silicon and lignin have been removed, and which also contains wash water 10, is conducted to a conventional evaporator 3. The black liquor 11 typically contains from 5 to 15% of dry matter. If incoming black liquor 5 is pre-evaporated before being saturated with carbon dioxide, the dry matter content of black liquor 11 may be higher. As a substantial portion of the lignin has now been separated from the black liquor and carbon dioxide has been absorbed into this, the calorific value of the dry matter of the liquor has been reduced. In evaporator 3 the dry matter content of the black liquor is increased by removing water 12, so that the organic component of outgoing evaporated black liquor 13 can be completely oxidised in an apparatus as the one described in Finnish patent No 98626 (European Patent Application No 95934138.9). This dry matter content will, of course, depend on the origin of the black liquor and on the amount of lignin removed from this. However, it is characteristic that the dry matter content of the black liquor may be markedly lower if it is supplied to this combustion device 4 than if it is conventionally burnt with air. A typical dry matter content is 40%.

In the drawing, 4 denotes the device described in Finnish patent specification 98626. In this device, the dry matter content of incoming liquor is increased by evaporation by direct contact with hot gas, and the liquor thus evaporated and heated to a high temperature is burnt in a pressurised reactor with a gas 14 consisting of oxygen-enriched air, from which the main portion of nitrogen has been removed, or optionally of pure oxygen gas. The inorganic combustion residue, consisting mainly of sodium carbonate, is dissolved in supplied water 15 and extracted from the device as a concentrated solution 16. The sodium carbonate may be causticised to sodium hydroxide using conventional methods.

When the combustion of the organic substance in the black liquor is performed with highly oxygen-enriched air or pure oxygen gas, the gaseous combustion product in apparatus 4 will mainly consist of carbon dioxide and water vapour. This gas is used internally for the evaporation of incoming black liquor 13, the water vapour concentration of the gas then increasing further. The vapour concentration of the gas is decreased by cooling it so that the vapour condensates in one or more heat exchangers, as described in Finnish patent 98626. The non-condensable portion of gas 17, put out from apparatus 4, contains at least 60% by weight of carbon dioxide, the amount of this being usually greater than the amount necessary for saturating the black liquor with carbon dioxide in contact device 1. A part flow 6 of gas 17 is used to precipitate silica and lignin in device 1 and the remainder 18 is used for other purposes or is discharged into the atmosphere.

The invention will be clarified in the following example.

EXAMPLE

A pulp mill produces 20,000 t of straw paper pulp by means of soda cooling. The annual operating time is 8,000 h/a, the production capacity being 2.5 t/h on the average, 330 kg of NaOH per tonne of produced pulp is added to the cook, the pulp yield being 466 kg of air-dry pulp per tonne of dry matter straw. Effective washing of the paper pulp yields approx. 31 m$^3$/h of a black liquor with the following composition for chemical recovery:

TABLE 1

|  | kg/h |
|---|---|
| Lignin | 720 |
| Organic substance, except for lignin | 1,320 |
| Silica | 410 |
| Inorganic substance, except for silica | 1,340 |
| Water | 27,570 |
| Total | 31,270 |

To saturate the black liquor with carbon dioxide, carbon dioxide should be added in an amount equivalent to the amount of sodium hydroxide charged to the cook. 825 kg of NaOH/h, i.e. 20.6 kmol/h is added to the cook. The equivalent carbon dioxide amount is 10.3 kmol/h, i.e. 455 kg of $CO_2$/h. The following material balance is then obtained for the precipitate of silica and lignin:

TABLE 2

|  | Incoming, kg/h | | | Outgoing, kg/h | |
|---|---|---|---|---|---|
|  | Black liquor | Carbon dioxide | Water | Black liquor | Precipitate |
| Lignin | 720 |  |  | 180 | 540 |
| Organic substance, except for lignin | 1,230 |  |  | 1,225 | 5 |
| Silica | 410 |  |  | 20 | 390 |
| Inorganic substance, except for $SiO_2$ | 1,340 | 455 |  | 1,590 | 8 |
| Water | 27,570 |  | 4,600 | 31,450 | 917 |
| Total | 31,270 | 455 | 4,600 | 34,465 | 1,860 |

In this context, the precipitate has assumingly been washed with 4,600 kg/h of water in order to remove practically all of the sodium from the precipitate, which is dewatered to a 50% dry content after the washing (N.B. that water is formed in neutralisation).

A calorimetric heat value of 23.8 MJ/kg can be expected for the lignin contained in the black liquor, and a calorimetric heat value of 17.6 MJ/kg for other organic substances, consisting mainly of carbon hydrates. If these values and the values of Table 2 are used, the dry matter content of the black liquor will have a calorific value of 10.5 MJ/kg before neutralisation, whereas the calorific value after neutralisation will be 8.6 MJ/kg. These calorific values can be compared with a calorific value of approx. 14.5 MJ/kg for the dry matter content of black liquor obtained in the production of sulphate pulp from softwood.

After the precipitate has been separated and washed, the dry matter content of the black liquor will be 8.5%. A dimensioning calculation for combustion apparatus 4, in which the black liquor is burnt, indicates that the liquor should be evaporated to an approx. 40% dry matter content before being supplied to apparatus 4. The material balance shown in Table 3 will then be obtained for the evaporation.

TABLE 3

|  | Incoming, kg/h Weak liquor | Outgoing, kg/h | |
|---|---|---|---|
|  |  | Strong liquor | Condensate |
| Organic substance | 1,405 | 1,395 | 10 |
| Inorganic substance | 1,610 | 1,610 | — |
| Water | 31,450 | 4,510 | 26,950 |
| Total | 34,465 | 7,515 | 26,950 |

It is observed that evaporator 3 should have an output of approx. 27 t of $H_2O$/h. If the evaporation is performed in an evaporator with four stages in series, its steam requirement will be approx. 27/4 t/h, i.e. approx. 6.8 t/h.

Table 4 shows a material and energy balance of apparatus 4. It has been calculated for an apparatus designed in accordance with the disclosure of Finnish patent 98626, based on a combustion temperature of approx. 1,200° C. in the reactor and a system pressure of 800 kPa (absolute). A small amount of burning oil is provided as auxiliary fuel to stabilise the combustion in the event of malfunctions.

TABLE 4

|  | Mass flow, kg/h | | | Temp. | Energy |
|---|---|---|---|---|---|
|  | substance | water | total | °C. | MJ/h |
| INCOMING |  |  |  |  |  |
| black liquor | 3,005 | 4,510 | 7,515 | 95 | 27,010 |
| burning oil | 25 |  | 25 | 60 | 980 |
| oxygen gas | 2,075 |  | 2,075 | 160 | 305 |
| water | — | 19,720 | 19,720 | 30 | 4,220 |
| TOTAL | 5,105 | 24,230 | 29,335 |  | 32,515 |
| OUTGOING | 1,625 | 5,645 | 7,270 | 105 | 2,655 |
| fresh liquor | 2,720 | 135 | 2,855 | 95 | 595 |
| carbon dioxide | — | 4,195 | 4,195 | 170 | 11,835 |
| steam 800 kPa | — | 4,285 | 4,285 | 120 | 11,590 |
| steam 200 kPa | — | 855 | 855 | 100 | 2,290 |
| steam 100 kPa | — | 830 | 830 | 95 | 330 |
| condensate | — | 9,045 | 9,045 | 85 | 3,220 |
| cooling water | — |  |  |  |  |
| TOTAL | 4,345 | 24,990 | 29,335 |  | 32,515 |

The flow rate of fresh liquor 16 from apparatus 4 is 7,270 kg/h and the flow contains 1,625 kg/h of inorganic salts. In these salts is included the sodium carbonate contained in the black liquor that enters apparatus 4, i.e. 10.3 kmol/h or 1,092 kg/h of sodium carbonate. The remainder, i.e. 533 kg/h, consists of other inorganic substances, which are dissolved from the straw in the pulp cook. Part of these inorganic substances is soluble potassium, whereas the main part of the substances form poorly soluble carbonates in concentrated solutions. These can be filtrated out from the solution, after which the soluble carbonates can be causticised with burnt lime to form hydroxides by means of conventional techniques. The hydroxide solution can be recycled as a cooking liquor in the straw soda cook. Essentially all of the sodium (and potassium) present in the black liquor 5 entering the chemical recovery apparatus described here can thus be recycled in the process.

Table 4 shows that 2,720 kg/h of a gas with a high carbon dioxide concentration is generated in apparatus 4. A more specified material balance of the apparatus indicates that this gas contains 2,450 kg/h of carbon dioxide, the remaining 270 kg/h being oxygen gas. In this case, the carbon dioxide concentration is about 90% by volume. The gas is present under a 800 kPa pressure. In this example, it was previously estimated that 454 kg/h of carbon dioxide was needed to neutralise the black liquor in apparatus 1. Thus it is seen that apparatus 4 produces gas containing carbon dioxide in a considerably greater amount than what is needed to neutralise the black liquor in contact device 1.

Table 4 shows that apparatus 4 generates approx. 4.2 t/h of process steam under a 800 kPa pressure and in addition approx. 4.3 t/h of process steam under a 200 kPa pressure. The vapours can be used jointly to evaporate the black liquor in evaporator 3. It has been calculated above in this example that approx. 6.8 t/h of steam was required for evaporation. Hence the steam generated in apparatus 4 is sufficient to meet the steam requirement for evaporation.

The precipitate 9 separated from the black liquor in separator 2 contains an appreciable amount of lignin. Considering the calorific value of lignin and the precipitate composition as defined in Table 2, a gross calorific value of 13.7 MJ/kg is obtained for the dry matter content of the precipitate. An estimation shows that approx. 4 t/h of steam can be generated if the precipitate is used as a fuel in the furnace of a steam boiler. In that case, the precipitate is preferably mixed with some other solid fuel having a lower ash content, e.g. straw or straw residue not usable in the pulp production.

What is claimed is:

1. A process for recovering alkali and energy from soda process black liquor containing silicate comprising the steps of:

(a) neutralizing said soda process black liquor containing silicate with a surplus of a gas containing over 60% by volume of carbon dioxide, to obtain a precipitate rich in silica and black liquor poor in silicate;

(b) separating said precipitate rich in silica from said black liquor poor in silicate;

(c) evaporating said black liquor poor in silicate to an evaporated black liquor; and (d) burning said evaporated black liquor with pure oxygen gas or oxygen-enriched air after said evaporated black liquor has been brought to a temperature near its boiling point under substantial over-pressure to recover a sodium carbonate melt and to form a gas containing mainly carbon dioxide which supplies the carbon dioxide of step a).

2. A process as claimed in claim 1, characterized in that the surplus of gas containing carbon dioxide is adjusted so as to keep approximately constant the carbon dioxide concentration of the gas not absorbed in the saturation of the black liquor containing silicate.

3. The process of claim 2 wherein step a) is performed at a temperature of at least 80° C. for at least 10 minutes.

4. The process of claim 2 wherein step d) is performed with gas containing at least 60% by volume of oxygen.

5. A process as claimed in claim 4, characterized in that the gas containing at least 60% by volume of oxygen is a pure oxygen gas.

6. The process of claim 1 wherein step a) is performed at a temperature of at least 80° C. for at least 10 minutes.

7. The process of claim 1 wherein step d) is performed with gas containing at least 60% by volume of oxygen.

8. A process as claimed in claim 7, characterized in that the gas containing at least 60% by volume of oxygen is a pure oxygen gas.

9. A process as claimed in claim 1, characterized in that the combustion is performed under an over-pressure of at least 100 kPa.

10. A process as claimed in claim 9, characterized in that the combustion is performed under a pressure in the range from 900 to 1,100 kPa.

11. A process as claimed in claim 1, characterized in that the combustion is performed at a temperature of at least 800° C.

12. A process as claimed in claim 4, characterized in that the combustion is performed at a temperature of at least 800° C.

13. A process as claimed in claim 1, characterized in that the separated silica precipitate is washed with water and the wash water is added to the black liquor poor in silicate prior to evaporation.

14. A process as claimed in claim 1, characterized in that the black liquor poor in silicate is evaporated to a dry matter content of at least 30% by weight.

15. A process as claimed in claim 1, characterized in that the gas rich in carbon dioxide obtained in the combustion is cooled to condensate vapour from it before the gas is used to saturate the black liquor containing silicate.

16. A process as claimed in claim 1, characterized in that the precipitate (9) containing lignin and silicate is used as a supplementary fuel in steam generation.

* * * * *